No. 669,718. Patented Mar. 12, 1901.
L. O. WHITTEMORE.
FEEDER FOR CORN SHELLERS.
(Application filed Dec. 3, 1900.)
(No Model.)
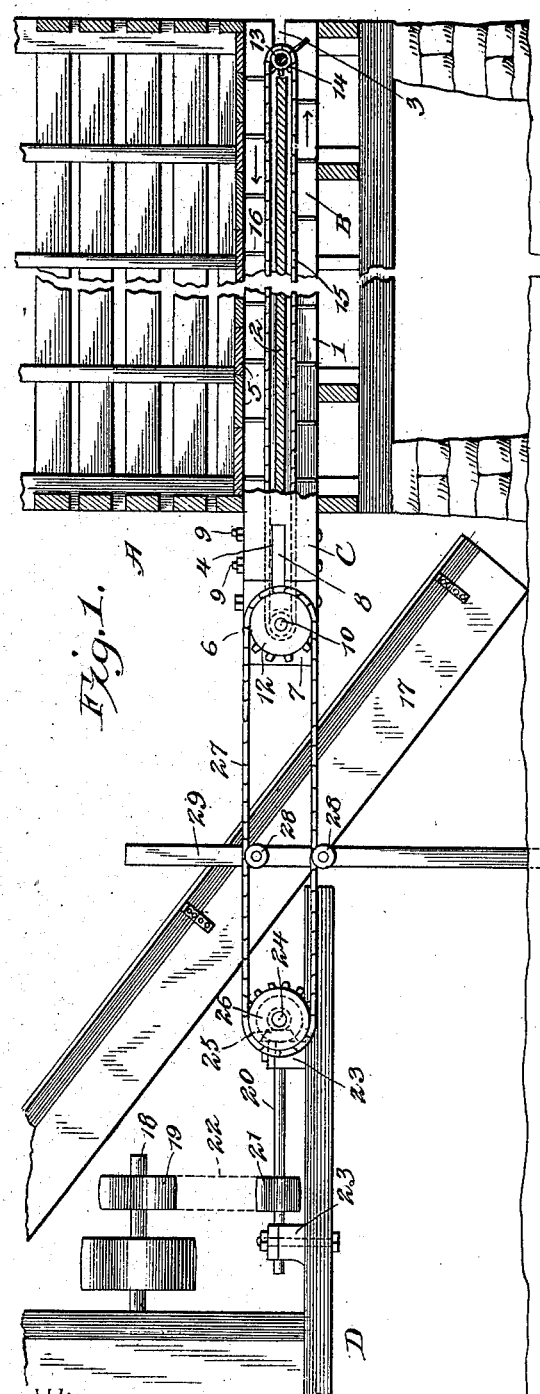
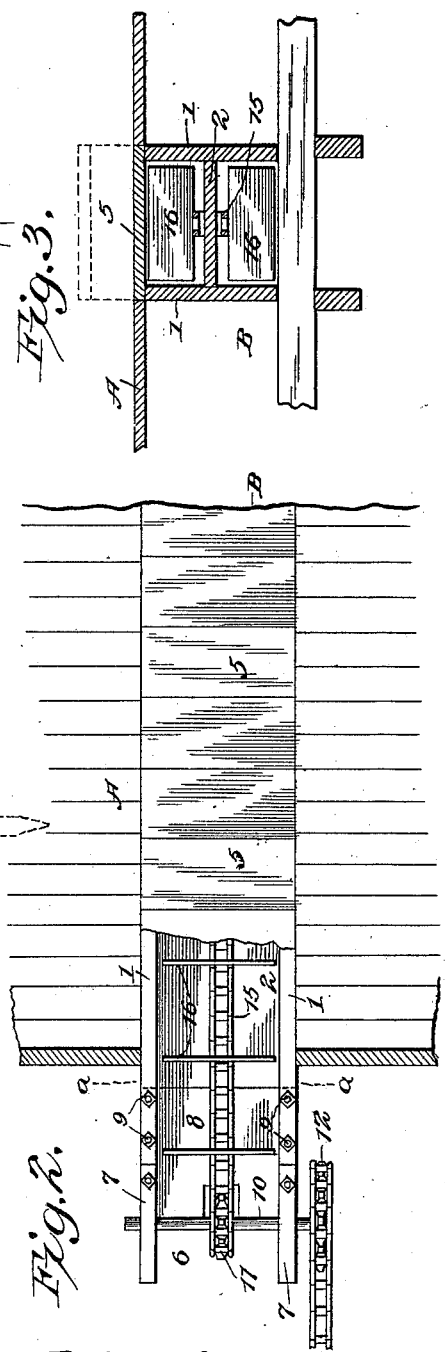
Witnesses
Howard D. Orr.
J. W. Garner
L. O. Whittemore, Inventor,
by C. A. Snow & Co.
Attorneys

UNITED STATES PATENT OFFICE.

LEWIS O. WHITTEMORE, OF VERONA, ILLINOIS.

FEEDER FOR CORN-SHELLERS.

SPECIFICATION forming part of Letters Patent No. 669,718, dated March 12, 1901.

Application filed December 3, 1900. Serial No. 38,501. (No model.)

*To all whom it may concern:*

Be it known that I, LEWIS O. WHITTEMORE, a citizen of the United States, residing at Verona, in the county of Grundy and State of Illinois, have invented a new and useful Feeder for Corn-Shellers, of which the following is a specification.

My invention is an improved feeder for corn-shellers; and it consists in the peculiar construction and combination of devices hereinafter fully set forth and claimed.

The object of my invention is to provide an improved conveyer-trough for discharging corn from a corn-crib and an improved mechanism, operated by power from a portable corn-shelling machine, which, in connection with the said trough, conveys the corn from the crib to the corn-shelling machine to feed the latter while the same is in operation.

In the accompanying drawings, Figure 1 is a transverse sectional view through a corn-crib provided with my improved conveying-trough and a partial elevation of a feeder for conveying corn from the crib to a corn-shelling machine. Fig. 2 is a top plan view of my improved feeder and a partial horizontal sectional view of the crib. Fig. 3 is a detail transverse sectional view taken on a plane indicated by the line *a a* of Fig. 2.

In the embodiment of my invention I provide a corn-crib A with a trough B, which is disposed under the floor of the crib and extends from one side thereof to the other, the ends of the trough being open and one end thereof projecting beyond one side of the crib, as at C. The trough B comprises the vertically-disposed side boards 1 and the horizontally-disposed connecting-board 2, which forms the bottom of the upper longitudinal section of the trough, the latter being substantially H-shaped in cross-section, as shown in Fig. 3. In the sides of the trough, at one end thereof, are open slots 3. In the sides of the trough, at the projecting ends C thereof, are open slots 4. The trough is covered by a series of removable sections 5, which are disposed, preferably, in the plane of the floor of the crib, as indicated in the drawings, so that when the sections 5 are removed to uncover the trough the corn in the crib may readily flow or be shoveled into said trough.

In connection with the trough B, which is a permanent structure and forms a portion of the crib, I employ a trough section or head 6, which comprises sides 7 and a projecting transversely-disposed connecting-board 8, which extends from the inner side of said trough head or section 6 and is adapted to fit in the openings 4 in the projecting end of trough B, the said head-section 6 being secured to said projection C of the trough by bolts or pins 9, which pass through alined openings in the sides of the trough and in the extended board 8 of section 6. In the sides of detachable section 6 is journaled a shaft 10, provided at its center with a sprocket-wheel 11 and at one end with a sprocket-wheel 12. A shaft 13 is adapted to be journaled in the end of the trough opposite the detachable section 6 by mounting said shaft 13 in the inner ends of the openings 3, and said shaft 13 has a sprocket-wheel 14. An endless conveying-chain 15, which is of suitable length and is constructed of detachable links, so that its length may be varied at will, is employed when the invention is in operation to connect the sprocket-wheels 14 11 on the respective shafts 13 10 and to operate on the board 2, which connects the sides of trough B, and said chain is provided at suitable regular distances apart with flights 16, which operate in the said trough B, the said chain and said flights comprising an endless traveling conveyer operated by the shafts 10 13 and which is adapted to convey corn delivered thereon from the crib through the trough and discharge the same onto the usual inclined conveyer 17, which carries the corn to the shelling-machine and feeds the same.

Only so much of a corn-shelling machine is here shown as is required for the explanation of my invention, the shelling-machine being indicated at D in Fig. 1 and being provided with the usual power-shaft 18, having a pulley 19. In the embodiment of my invention I provide the corn-shelling machine with a shaft 20, having a pulley 21, which is connected to the pulley 19 of power-shaft 18 by an endless belt, (indicated at 22.) Said shaft 21 is mounted in suitable bearings 23 on a portion of the frame of the corn-shelling machine, and said shaft 20 is geared to a stub-shaft 24 by means of beveled gears 25, (indicated in dotted lines in Fig. 1.) Said stub-shaft 24 is mounted in a suitable bearing on the frame of the corn-sheller and is provided with a sprocket-wheel 26, which is connected to the sprocket-wheel 12 of shaft 10 by an endless sprocket-chain 27. Thereby power is conveyed from the corn-shelling machine to the feed-conveyer in the trough B. In practice the chain 27 is of considerable length, owing to the length of the conveyer 17, and I employ idle sheaves 28, which support the intermediate portions of said chain, said sheave 28 being mounted on a stake 29, which may be readily driven into the ground in the required position, as shown in Fig. 1.

In practice a single corn-shelling machine is usually sufficient to shell all the corn raised on a number of farms in a neighborhood, and I provide a corn-shelling machine, as hereinbefore indicated, with the trough-section 6, and propose to provide all of the corn-cribs in the neighborhood in which the corn-shelling machine is used with troughs B, so that the corn-sheller may be connected to various troughs B of the corn-cribs and used for feeding the corn from the cribs to the sheller.

In setting up the corn-shelling machine for operation in connection with my improved feeder I first attach the sections 6 to the projecting ends C of the trough B, mount the shaft 13 in the opposite end of the trough, connect the said shafts 13 10 by the conveyer-chain 15 by causing the same to engage the sprocket-wheels on said shafts, the chain being lengthened or shortened, as may be required to adapt the same to the length of the trough B, and then connect the sprocket-wheel 12 of detachable section 6 of the trough B with the sprocket-wheel 26, driven by the corn-shelling machine, by the chain 27, as hereinbefore stated. When the crib has been emptied and the corn shelled, the sections 5 are replaced on the trough B to cover the same, the chain 15 disconnected, the shaft 13 unshipped, and the detachable section 6 of the feed-conveyer trough removed therefrom. The corn-shelling machine is then driven to another crib and the operation hereinbefore described repeated.

Having thus described my invention, I claim—

1. A feeder for corn-shellers comprising a fixed trough, a detachable section at one end thereof, a shaft journaled in said detachable section, and having a power-wheel, bearings at the opposite end of said trough, a shaft in and adapted to be unshipped from said bearings and an endless conveyer connecting said shafts, substantially as described.

2. A feeder for corn-shellers comprising a fixed trough having open bearings at one end, a shaft in said bearings, a detachable section at the opposite end, a power-shaft journaled in bearings in said detachable section, and an endless conveyer connecting said shafts and disposed in said trough, substantially as described.

3. A feeder for corn-shellers, having a trough, a removable cover for the trough, the latter comprising the side boards 1 and connecting-board 2 and having the openings 3 in one end and the openings 4 at the other end, a shaft 13 adapted to be mounted in said openings 3, a detachable section having the extended board 8 at its inner end adapted to be secured in the openings 4, the shaft 10 in said detachable section, means to rotate said shaft and an endless traveling conveying element connecting said shafts 10, 13, and operating in said trough, substantially as described.

4. A feeder for corn-shellers comprising a fixed trough having open slots in its sides at opposite ends, a roller having its bearings in said slots at one end of said trough, a detachable section having side extensions fitted and detachably secured at the opposite end of said trough, a power-shaft journaled in said detachable section and an endless conveyer connecting said shafts, substantially as described.

In testimony that I claim the foregoing as my own I have hereto affixed my signature in the presence of two witnesses.

LEWIS O. WHITTEMORE.

Witnesses:
HENRY BRINK,
J. L. WATERMAN.